(12) United States Patent
Rozot

(10) Patent No.: US 11,446,770 B2
(45) Date of Patent: Sep. 20, 2022

(54) SYSTEMS, APPARATUSES, AND METHODS FOR REDUCING THE SIZE OF A MATERIAL

(71) Applicant: Thierry Rozot, Valparaiso, IN (US)

(72) Inventor: Thierry Rozot, Valparaiso, IN (US)

(*) Notice: Subject to any disclaimer, the term of this patent is extended or adjusted under 35 U.S.C. 154(b) by 160 days.

(21) Appl. No.: 16/866,105

(22) Filed: May 4, 2020

(65) Prior Publication Data
US 2020/0346305 A1  Nov. 5, 2020

Related U.S. Application Data

(60) Provisional application No. 62/842,559, filed on May 3, 2019, provisional application No. 62/842,564, filed on May 3, 2019, provisional application No. 62/842,574, filed on May 3, 2019.

(51) Int. Cl.
*B23K 26/38* (2014.01)
*B23K 103/04* (2006.01)

(52) U.S. Cl.
CPC .......... *B23K 26/38* (2013.01); *B23K 2103/04* (2018.08)

(58) Field of Classification Search
CPC ...... B23K 26/38; B23K 2103/04; B23K 7/08; B23K 37/0235
USPC ............. 219/121.39, 121.67, 121.71, 121.72
See application file for complete search history.

(56) References Cited

U.S. PATENT DOCUMENTS

| | | | |
|---|---|---|---|
| 1,958,044 A | 5/1934 | Hendricks | |
| 3,503,557 A | 3/1970 | Hutton, Jr. | |
| 4,379,002 A | 4/1983 | Saito et al. | |
| 5,312,091 A * | 5/1994 | Vogrin | B23K 7/06 266/51 |
| 5,876,162 A * | 3/1999 | Mancuso | B23D 1/26 409/300 |
| 6,277,322 B1 | 8/2001 | Lotz | |
| 6,334,906 B1 * | 1/2002 | Donze | B23K 7/105 148/203 |
| 6,534,739 B2 | 3/2003 | Donze et al. | |
| 6,712,911 B2 | 3/2004 | Donze et al. | |
| 6,787,731 B1 | 9/2004 | Prioretti et al. | |
| 7,007,737 B2 | 3/2006 | Alexin | |
| 7,377,987 B2 | 5/2008 | Goffette | |

(Continued)

FOREIGN PATENT DOCUMENTS

JP     05-329687 A    * 12/1993

*Primary Examiner* — Thien S Tran
(74) *Attorney, Agent, or Firm* — Hartman Global IP Law; Gary M. Hartman; Domenica N. S. Hartman

(57) ABSTRACT

Automated systems and methods for making cuts in large masses of materials, including lateral cuts to reduce the lengths of steel slabs and produce therefrom slabs of desired sizes for producing steel plates. Such a system includes an apparatus having a support that supports the material, and a torch arm translatable in a Y-direction of the material and supporting a torch that emits a torch flame to make a cut in a Z-direction of the material while supported by the support. The apparatus has a deburring device associated with the torch arm and translatable in the Y-direction to perform a deburring operation by emitting an oxidizing gas stream that simultaneously removes burrs along the lateral cut produced by the torch in synchrony with translation of the torch in the Y-direction as the lateral cut is produced by the torch to oxidize the burrs before the burrs solidify.

23 Claims, 17 Drawing Sheets

(56) References Cited

U.S. PATENT DOCUMENTS

| | | |
|---|---|---|
| 7,378,051 B2 | 5/2008 | Alexin |
| 7,485,192 B2 | 2/2009 | Gofette |
| 7,806,029 B2 | 10/2010 | Rozot et al. |
| 8,402,868 B2 | 3/2013 | Rozot et al. |
| 9,370,840 B1 | 6/2016 | Rozot |
| 2005/0067054 A1* | 3/2005 | Alexin ............... B23K 7/10 148/194 |
| 2005/0067133 A1* | 3/2005 | Alexin ............ B22D 11/126 164/460 |
| 2009/0214990 A1* | 8/2009 | Evertz ............... F23D 14/58 239/589 |
| 2013/0203320 A1 | 8/2013 | Ghalambor |
| 2017/0129119 A1 | 5/2017 | Rozot |
| 2019/0118400 A1 | 4/2019 | Rozot |
| 2020/0108460 A1 | 4/2020 | Rozot |

\* cited by examiner

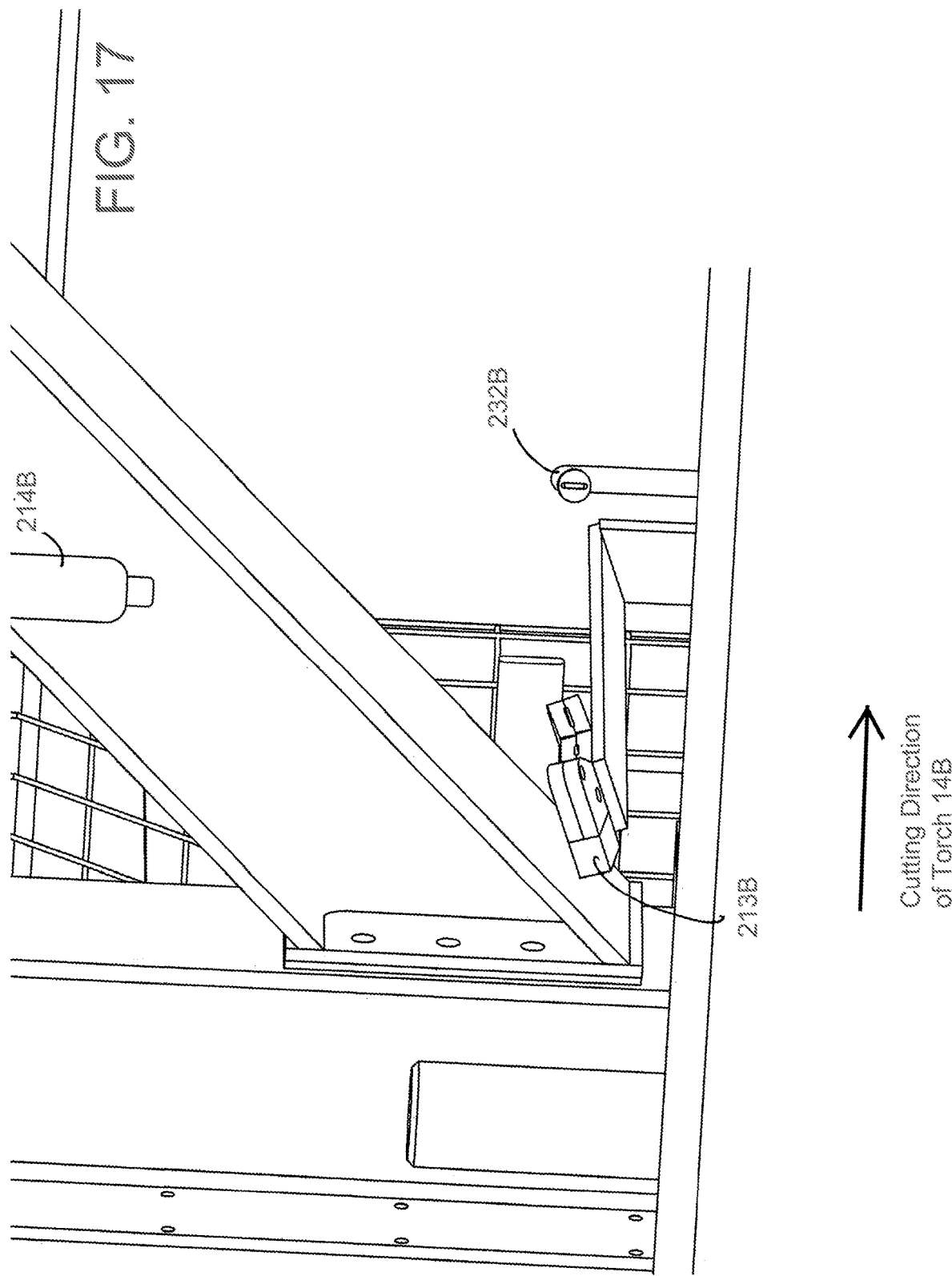

SYSTEMS, APPARATUSES, AND METHODS FOR REDUCING THE SIZE OF A MATERIAL

CROSS-REFERENCE TO RELATED APPLICATIONS

This application claims the benefit of U.S. Provisional Application Ser. Nos. 62/842,559 filed May 3, 2019, 62/842,564 filed May 3, 2019, and 62/842,574 filed May 3, 2019. The contents of these prior applications are incorporated herein by reference.

BACKGROUND OF THE INVENTION

The invention relates to systems, apparatuses, and methods for reducing the size of a material. The invention particularly relates to automated systems and methods for making cuts in large masses of materials, including but not limited to the ability to make cuts to reduce the sizes, and particularly the lengths, of steel slabs and produce therefrom reduced-size pieces, preferably with the ability to eliminate or at least reduce the need to perform a separate deburring operation on a material after undergoing such a cut.

For achieving high yields of quality steel plates in a steel mill, it is important that a slab from which a plate is rolled is free of defects. Such defects may be the result of metallurgical defects or irregularities often present at the ends of a slab, as well as burrs created when the slab is cut to a length suitable for producing a plate. Yield may be defined as the ratio of the weight of prime steel slab consumed during a rolling operation and the weight of the final slab product, such as a plate produced by rolling a slab. If a rolling operation produces plates containing defects resulting from defects or burrs present in the slabs from which they were rolled, plates must be produced that are larger than otherwise required to permit removal of the defects, with the result that yield is reduced.

In most steel mills, the burr removal (deburring) process and in some cases the cutting operation are performed manually. Deburring is often performed with a slash hammer or grinding machine and is therefore very labor intensive. Various deburring devices and equipment capable of automating the deburring process have been proposed, including devices and/or equipment disclosed in U.S. Pat. No. 1,958,044 to Hendricks, U.S. Pat. No. 3,503,557 to Hutton, Jr., U.S. Pat. No. 4,379,002 to Saito et al., U.S. Pat. No. 5,312,091 to Vogrin, U.S. Pat. No. 6,277,322 to Lotz, U.S. Pat. No. 6,334,906 to Donze, U.S. Pat. No. 7,378,051 to Alexin, U.S. Pat. No. 7,007,737 to Alexin, U.S. Pat. No. 7,806,029 to Rozot et al., U.S. Pat. No. 7,377,987 to Goffette, and U.S. Pat. No. 6,787,731 to Prioretti et al., and U.S. Patent Application Publication Nos. 2005/0067054 to Alexin, 2013/0203320 to Ghalambor, 2017/0129119 to Rozot 2019/0118400 to Rozot, 2020/0108460 to Rozot.

BRIEF DESCRIPTION OF THE INVENTION

The present invention provides automated systems and methods for making cuts in large masses of materials, including but not limited to lateral (cross) cuts to reduce the lengths of steel slabs and produce therefrom slabs of desired sizes for producing (rolling) steel plates. The invention additionally preferably encompasses the ability to reduce if not eliminate the need to perform a separate deburring operation on a slab after undergoing such a cut.

According to one aspect of the invention, an automated cutting system reduces the size of a material by making at least one lateral cut along a Y-direction of the material. The automated cutting system includes an apparatus having at least a first support adapted to at least partially support the material, and at least a first torch arm translatable in the Y-direction and supporting at least a first torch adapted for performing a cutting operation to form a lateral cut in the material in the Y-direction of the material. The first torch emits a torch flame in a torch direction so as to make a cut in a Z-direction of the material and so that the torch flame produces the lateral cut in a cutting direction in the Y-direction of the material while the material is supported by the first support. The apparatus further has at least a first deburring means associated with the first torch arm and translatable in the Y-direction to perform a first deburring operation by emitting a first oxidizing gas stream that simultaneously removes burrs along the lateral cut produced by the first torch in synchrony with translation of the first torch in the Y-direction as the lateral cut is produced by the first torch to oxidize the burrs before the burrs solidify. The first deburring means oscillates the first oxidizing gas stream in the Y-direction between locations that lead and trail a breakthrough point at which the lateral cut is generated in the material by the first torch.

Additional aspects of the invention include methods of reducing the size of a material to produce therefrom one or more reduced-size pieces using an automated cutting system comprising the elements described above.

Technical effects of systems and methods as described above preferably include the ability to simultaneously perform automated cutting and deburring operations on a steel slab to reduce if not eliminate the laborious task of cutting slabs and then later mechanically removing burrs from the slabs.

Various aspects and advantages of this invention will be appreciated from the following detailed description.

BRIEF DESCRIPTION OF THE DRAWINGS

FIGS. 14 through 17 represent various views of a cross-cutting apparatus of the system of FIG. 13, in which the apparatus is adapted to make a lateral cut in a steel slab as the slab exits a continuous caster machine to produce reduced-size slabs and simultaneously debur the cut edges of the lateral cut.

DETAILED DESCRIPTION OF THE INVENTION

Figure 1:
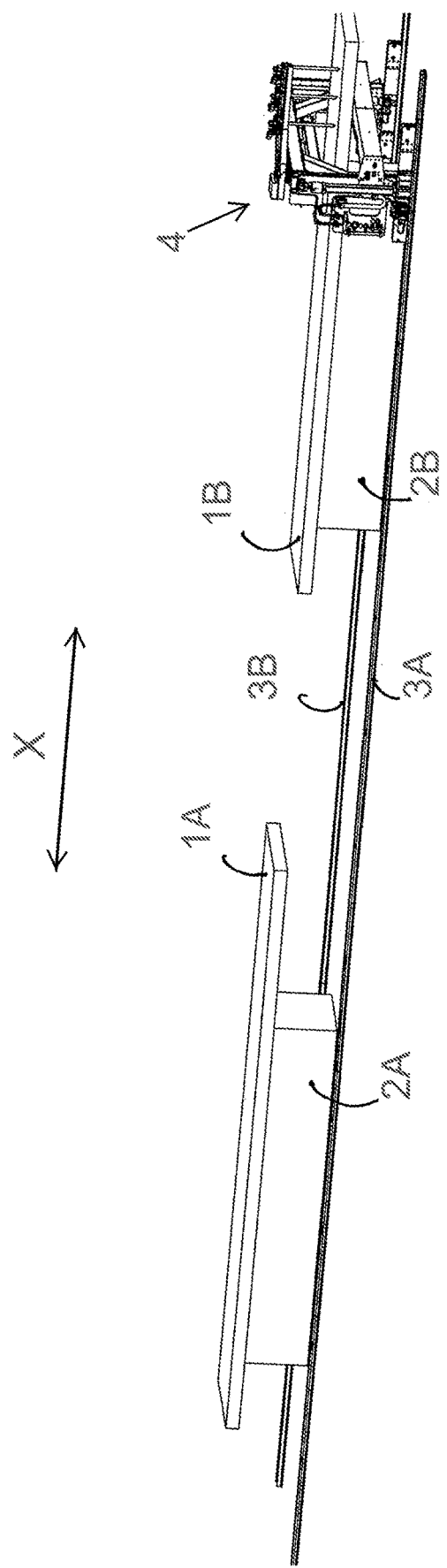
FIG. 1 is a perspective view schematically representing an automated cutting system for making cuts in one or more large masses of material according to a nonlimiting embodiment of the present invention.

FIGS. 1 through 8, 9 through 12, and 13 through 17 schematically represent nonlimiting embodiments of automated cutting systems adapted to make at least lateral/cross (Y-direction/axis) cuts in large masses of material, for example, to reduce the size (length) of a metal slab by making through-thickness (Z-direction/axis) cuts in the slab. Preferably, the systems also provide the capability of reducing if not eliminating the need to perform separate and subsequent deburring operations on a slab after undergoing such a cut. The cutting systems are particularly well suited for performing cutting and deburring operations on steel slabs and, as a matter of convenience, will be shown and described in reference to cutting steel slabs, though it should be understood that the cutting systems are not so limited.

To facilitate the descriptions provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to the orientation of the systems during their operation as represented in the drawings. Additionally, references to the X, Y, and Z directions should be understood as encompassing movements in any direction parallel to, respectively, X-, Y-, and Z-axes that are identified in the drawings and defined herein as referring to, respectively, the length, width, and thickness directions of a slab. All such relative terms are intended to indicate the construction, installation and use of the embodiments represented in the drawings and therefore help to define the scope of the embodiments.

As a matter of convenience, a slab initially placed or otherwise entering any of the systems represented in the drawings to undergo cutting will simply be referred to as a slab, a piece cut from such a slab will be referred to as a slab piece, a slab piece removed from a slab to eliminate a defect from the slab or is otherwise intended to be scrapped or remelted in a furnace will be referred to as a scrap piece, and the portion of a slab that remains after removal of one or more slab pieces will be referred to as a reduced-size slab.

The embodiment of the cutting system represented in FIGS. 1 through 8 utilizes an apparatus 4 that can be adapted for use in different settings to address different needs in steel-related industries. The following discussion will make reference to the use of the system to reduce the length of a slab and simultaneously reduce the size of pieces cut from the slab. The cutting system represented in FIG. 1 is configured as a fully-automated cutting and deburring system that can perform cross (lateral) cuts in a stationary slab 1A/1B to yield a reduced-size slab (or slab piece) of a desired length for undergoing a subsequent rolling operation to produce a steel plate and yield substantially defect- and burr-free slabs to achieve high yields of quality steel plates in a steel mill.

Often in steel mills, slabs must be reduced to have appropriate lengths for a particular order and/or to remove defects. Slab pieces removed from slabs are typically scrap pieces that are returned to a furnace, for example, an electric arc furnace or basic oxygen furnace, to be remelted to produce additional slabs. However, the sizes and weight of scrap pieces that can be placed in a furnace are often limited, and a scrap piece over the limit of a furnace must be reduced in size.

The apparatus 4 is represented in FIGS. 1 through 8 as adapted to reduce the lengths of multiple slabs 1A and 1B separately supported by a corresponding number of supports 2A and 2B, which may be constructed by stacking scrap slabs. More than one slab 1A and 1B can be positioned at separate cutting stations as show in FIG. 1 to optimize production. In the particular example shown, after the slab 1B is finish cut the apparatus 4 can travel to the other slab 1A located at a second station. The slab 1B can then be removed and another slab loaded on the support 2B while the slab 1A is being cut. The apparatus 4 translates between the supports 2A and 2B by traveling in the X-direction on wheels 25A, 26A, 25B, and 26B (FIG. 5) supported on tracks 3A and 3B (FIGS. 1 though 4). Two gear boxes 21A and 21B are coupled to two pinions 23A and 23B and servomotors 22A and 22B (FIG. 8) to move the apparatus 4 in the X-direction along the tracks 3A and 3B.

In the particular embodiment represented in the drawings, slab pieces cut from the slabs 1A and 1B are scrap. The apparatus 4 represented in FIGS. 1 through 8 comprises more than one cutting torch (for example, an oxy-fuel cutting torch) to simultaneously make multiple cuts along the Y-direction to enable the size of a slab and the size of one or more scrap pieces cut from the slab to be simultaneously reduced in one operation. The torches are collectively identified below with reference number 14 (e.g., torches 14), and individually referred to below and identified in the drawings with a letter suffix (e.g., 14A, 14B, or 14C). The innermost torch 14A produces the cut that removes the scrap piece(s) from the slab 1A/1B to yield a reduced-size slab that has a desired length and is preferably free of defects. Depending on the length reduction, the remaining torches 14B and 14C may be simultaneously used with the torch 14A to reduce the size of the scrap piece otherwise produced by the torch 14A, producing reduced-sized scrap pieces.

Figure 2:
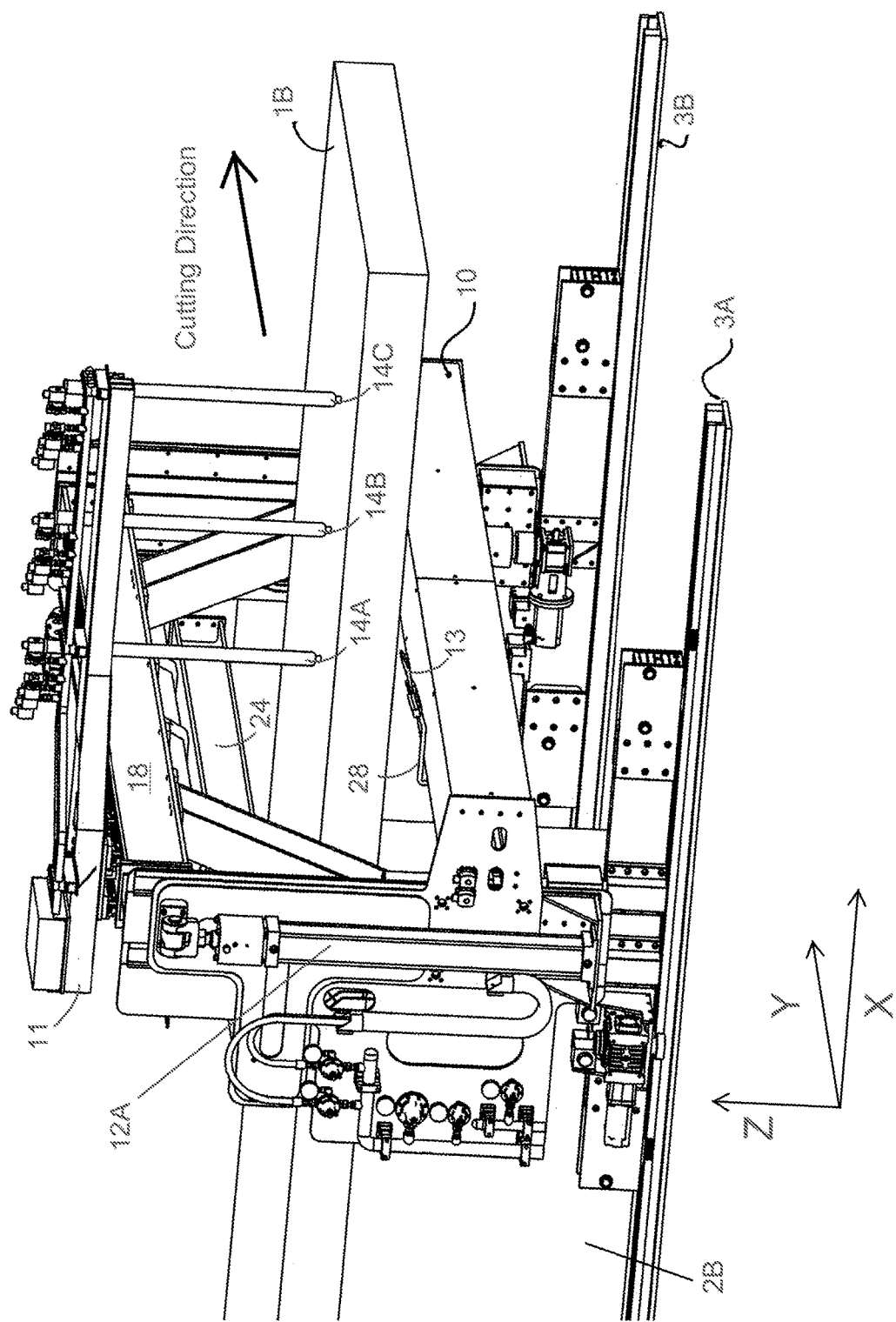
FIGS. 2 through 8 represent various views of a cross-cutting apparatus of the system of FIG. 1, in which the apparatus is adapted to make one or more lateral cuts in a steel slab to remove material from the end of the slab, simultaneously debur the resulting reduced-size slab, and simultaneously make one or more cross cuts in a slab piece cut from the slab.
Figure 3:
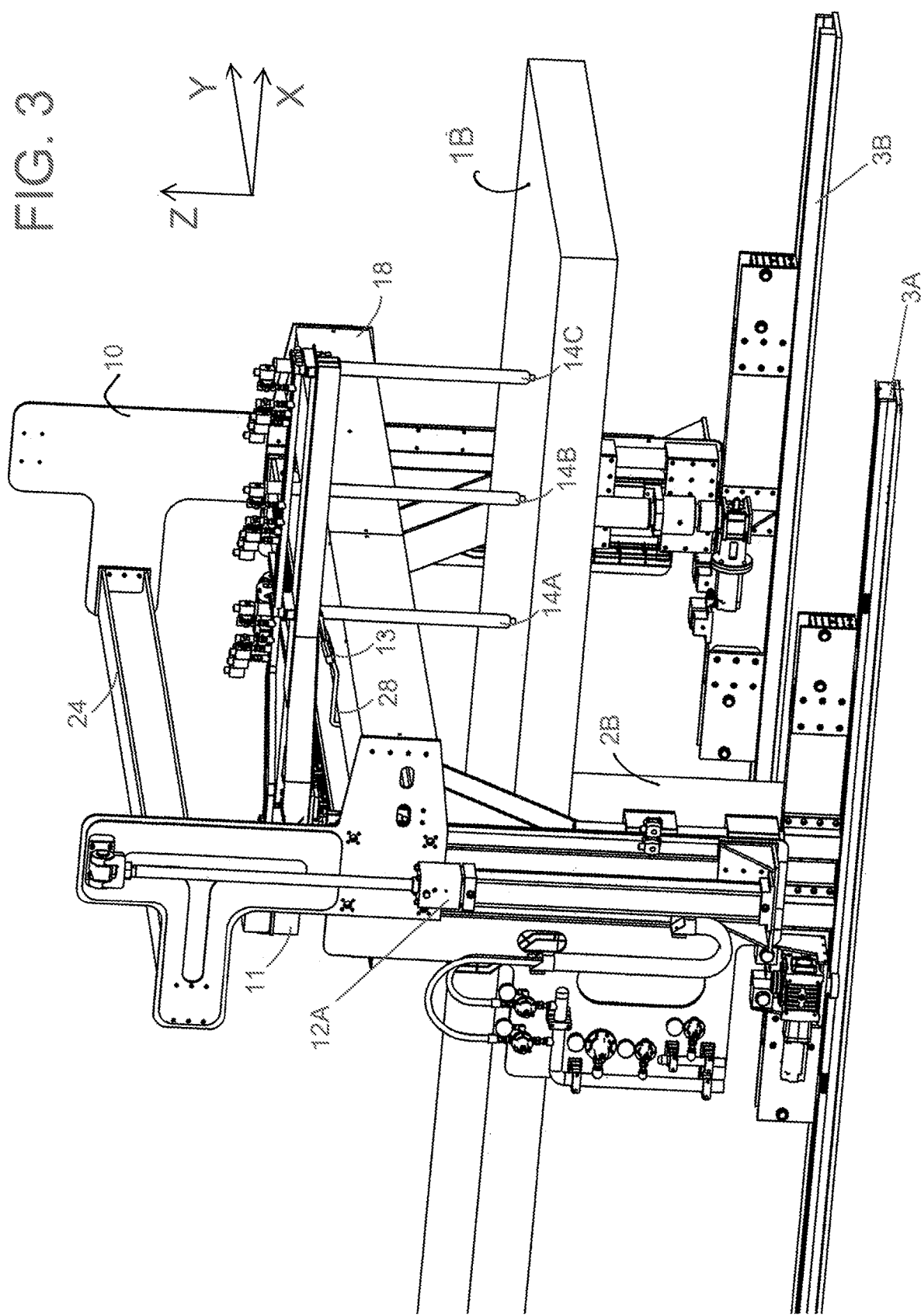
Figure 4:
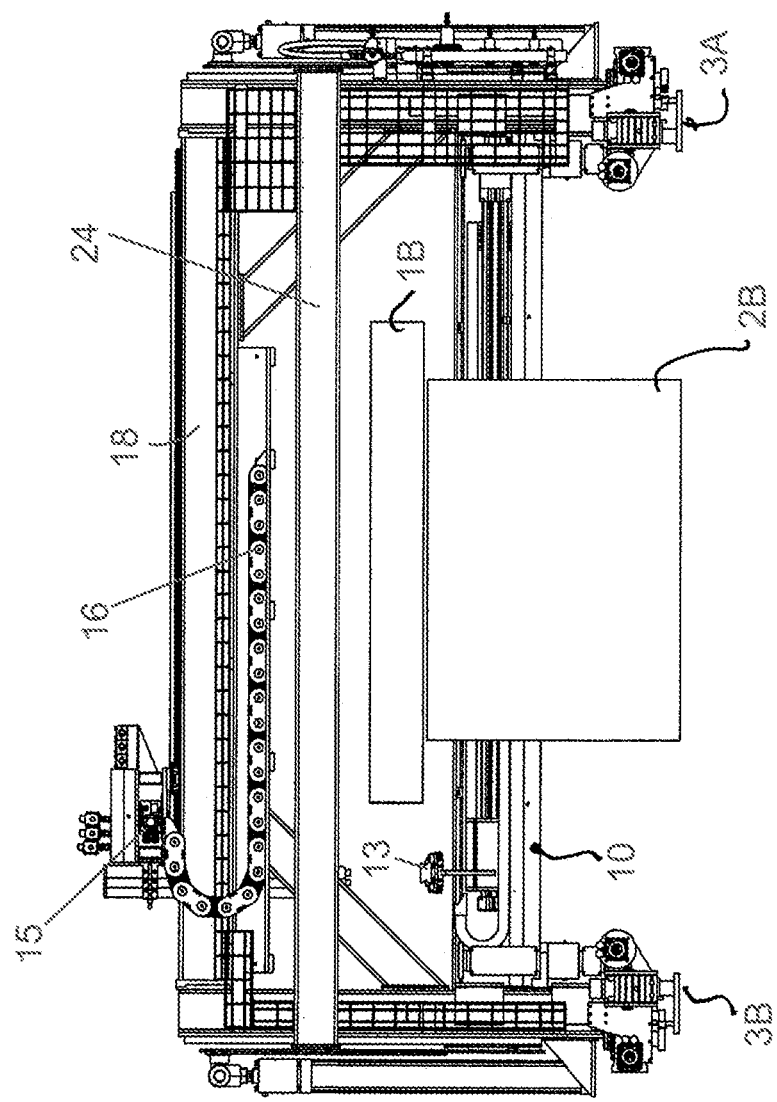

The resulting reduced-size slab is preferably free of defects including burrs created during the cutting operation, requiring that the cut produced by the torch 14A is burr-free. For this reason, the apparatus 4 further comprises a deburring device 13 to remove burrs generated on the side of the cut produced by the torch 14A on the reduced-size slab. FIGS. 2 and 3 are close-up views of the apparatus 4 showing the functionality of the deburring device 13, which is carried by a deburring assembly 10 to enable the deburring device 13 to be capable of moving in the Y and Z directions. FIG. 4 is a rear view of the apparatus 4 in relation to the perspective view of FIG. 1. FIGS. 5, 6, 7, and 8 are close-up views of the apparatus 4 with the slabs 1A and 1B and supports 2A and 2B omitted.

Figure 5:
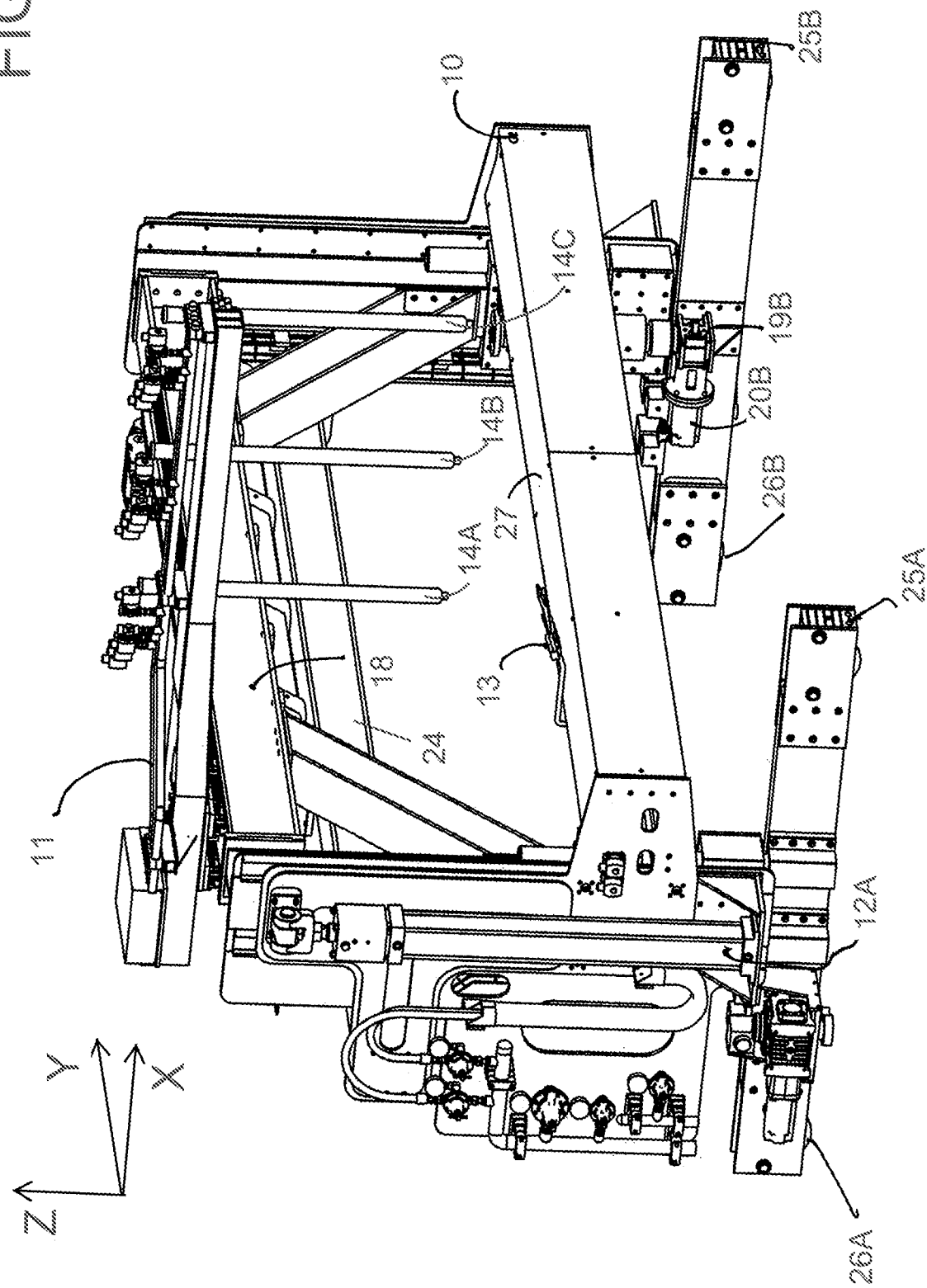
Figure 6:
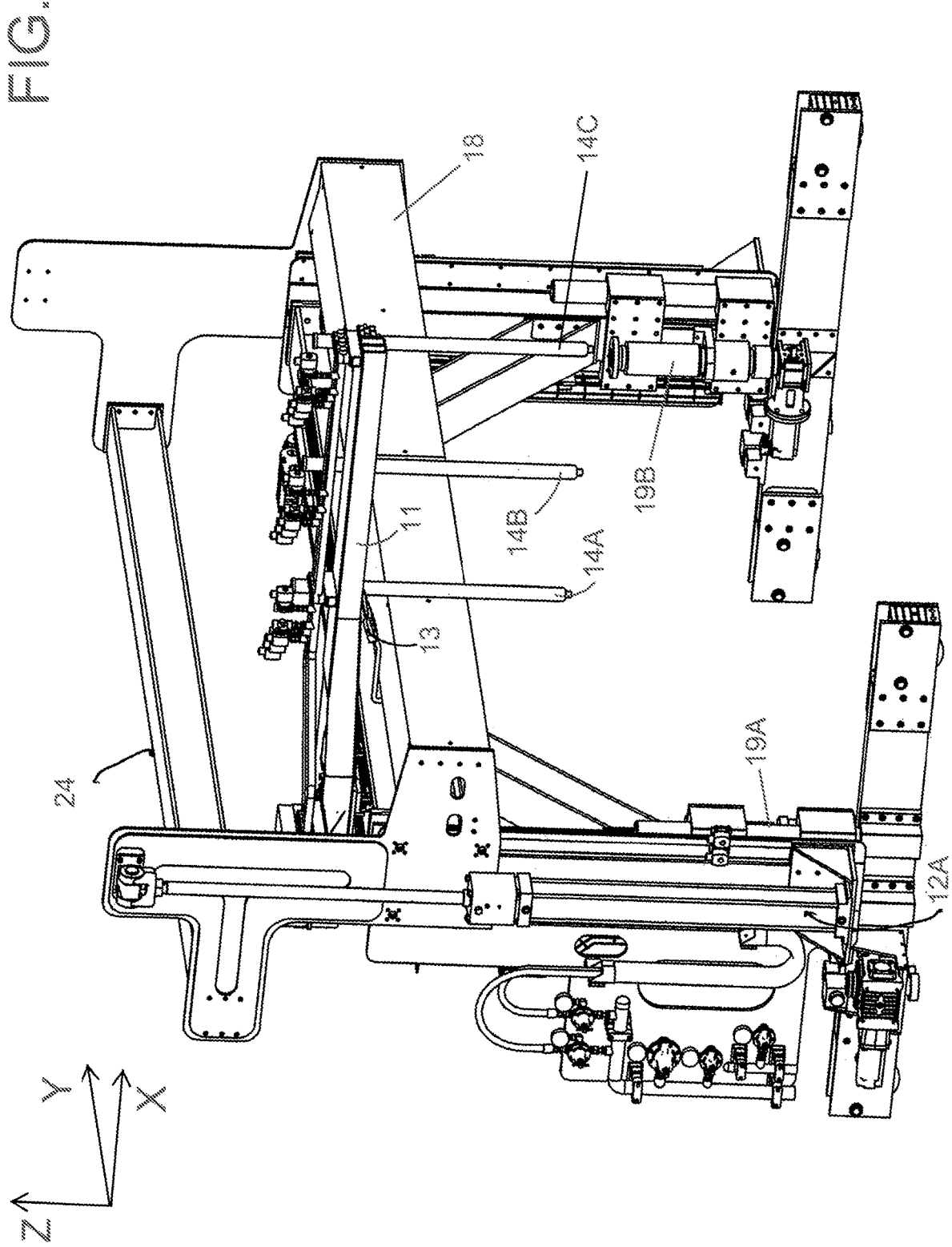
Figure 8:
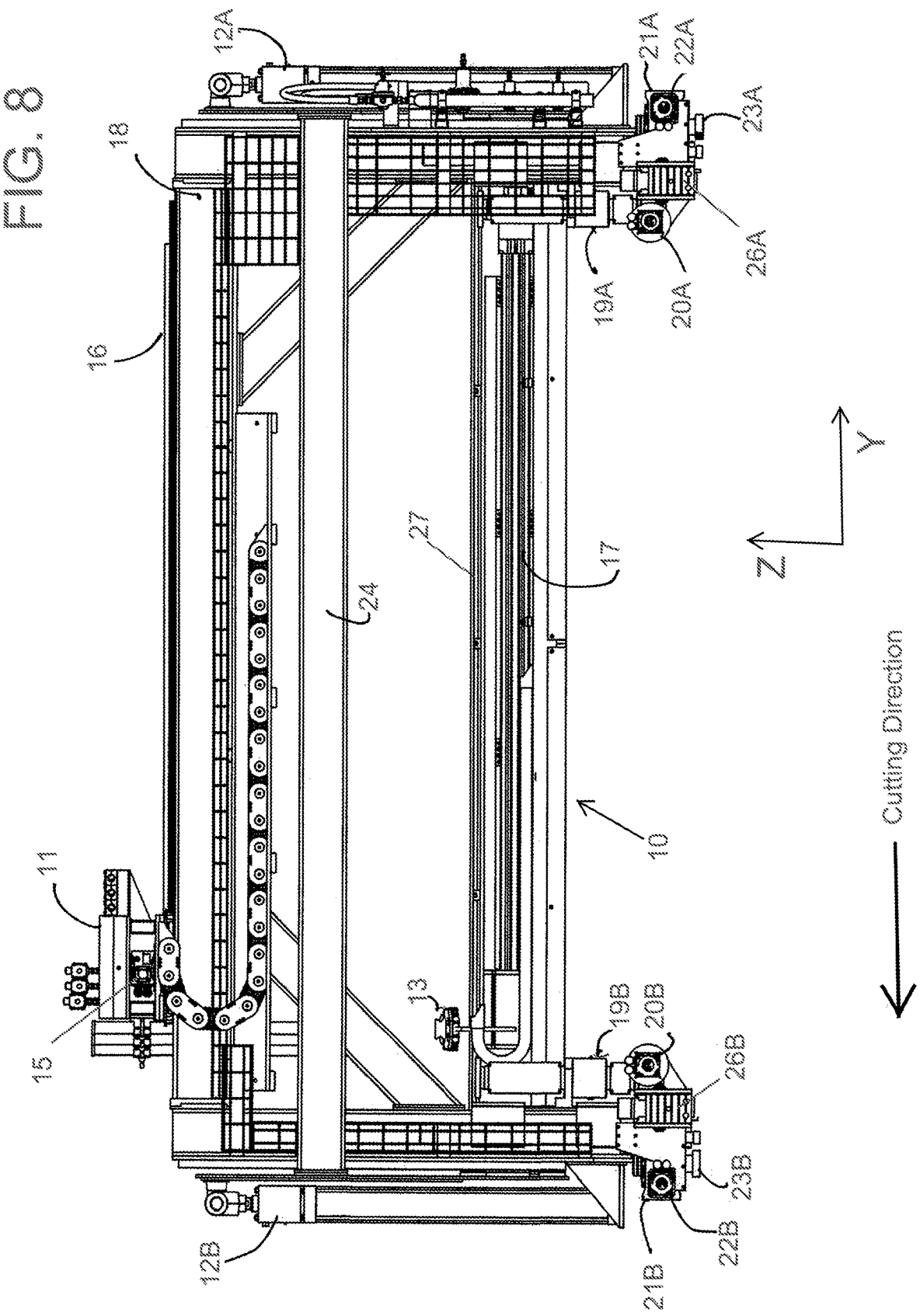

The deburring assembly 10 is translatable in the Z-direction via pneumatic cylinders 12A and 12B (FIG. 8) to provide two positions in which the deburring assembly 10 is extended upward as shown in FIGS. 3 and 6 to be able to clear the slabs 1A and 1B and supports 2A and 2B, in which case deburring does not occur, and retracted downward as shown in FIGS. 2, 4, and 5 to position the deburring device 13 underneath a slab (1B in FIGS. 2 and 4) in order to perform the deburring operation by emitting a oxidizing gas stream that removes burrs generated along the cut produced by the torch 14A. The deburring device 13 is capable of translating in the Y-direction via a deburrer translation assembly 17 comprising a servomotor and screw-based linear actuator (FIG. 8). A nonlimiting example of a suitable deburring device is disclosed in U.S. Patent Application Publication No. US2017/0129119, whose contents are incorporated herein by reference. The oxidizing gas stream of the deburring device 13 is preferably predominantly oxygen up to 100% oxygen to oxidize burrs that form during the cutting operation before they are able to solidify. For this purpose, the deburring device 13 oscillates, or at least oscillates its oxidizing gas stream, in the Y-direction between locations that immediately lead and trail a breakthrough point at which the cut is being generated in a slab 1A/1B by the torch 14A. Oscillation may be induced by the servomotor and screw-based linear actuator in the entire deburring assembly 10, or in only the deburring device 13 with a separate and dedicated oscillation mechanism.

The torches 14 are held by a torch arm 11 that extends in the X-direction from an upper frame 18. The torch arm 11 orients the torches 14 so that each emits a torch flame in a "torch" direction that is generally parallel to the Z-axis as shown, so as to make cuts in the Z (through-thickness) direction of the slab 1A/1B, and the torch arm 11 is translatable in the Y (width) direction so that the torch flame of each torch 14 is capable of producing a lateral (cross) cut in a "cutting" direction that is parallel to the Y-axis of the slab 1A/1B. A servomotor 15 and a track and rack assembly 16 (FIGS. 4 and 7) translate the torch arm 11 in the Y-direction. During the cutting operation, the deburring device 13 and torch arm 11 are synchronized by any suitable controller (not shown) to keep the center of the deburring device 13 aligned with the innermost torch 14A, as perhaps most evident in FIG. 7. The deburring device 13 is shown as oriented to emit its oxidizing gas stream at the cut produced by the torch 14A and toward a scrap piece removed thereby (and therefore toward the remaining torches 14B and 14C), generally in an upward direction transverse to the Y-direction, such as in the X-Z plane. This allows scrap pieces cut from a slab to fall without damaging the deburring device 13. This orientation is also preferable because only the edge on the remaining reduced-size slab that is formed by the cut produced by the torch 14A needs to be burr-free, since the pieces removed by the torch 14A from the slab are scrap pieces. The orientation of the deburring device 13 may be achieved simply by rotating the deburring device 13 on its support arm 28.

Figure 7:
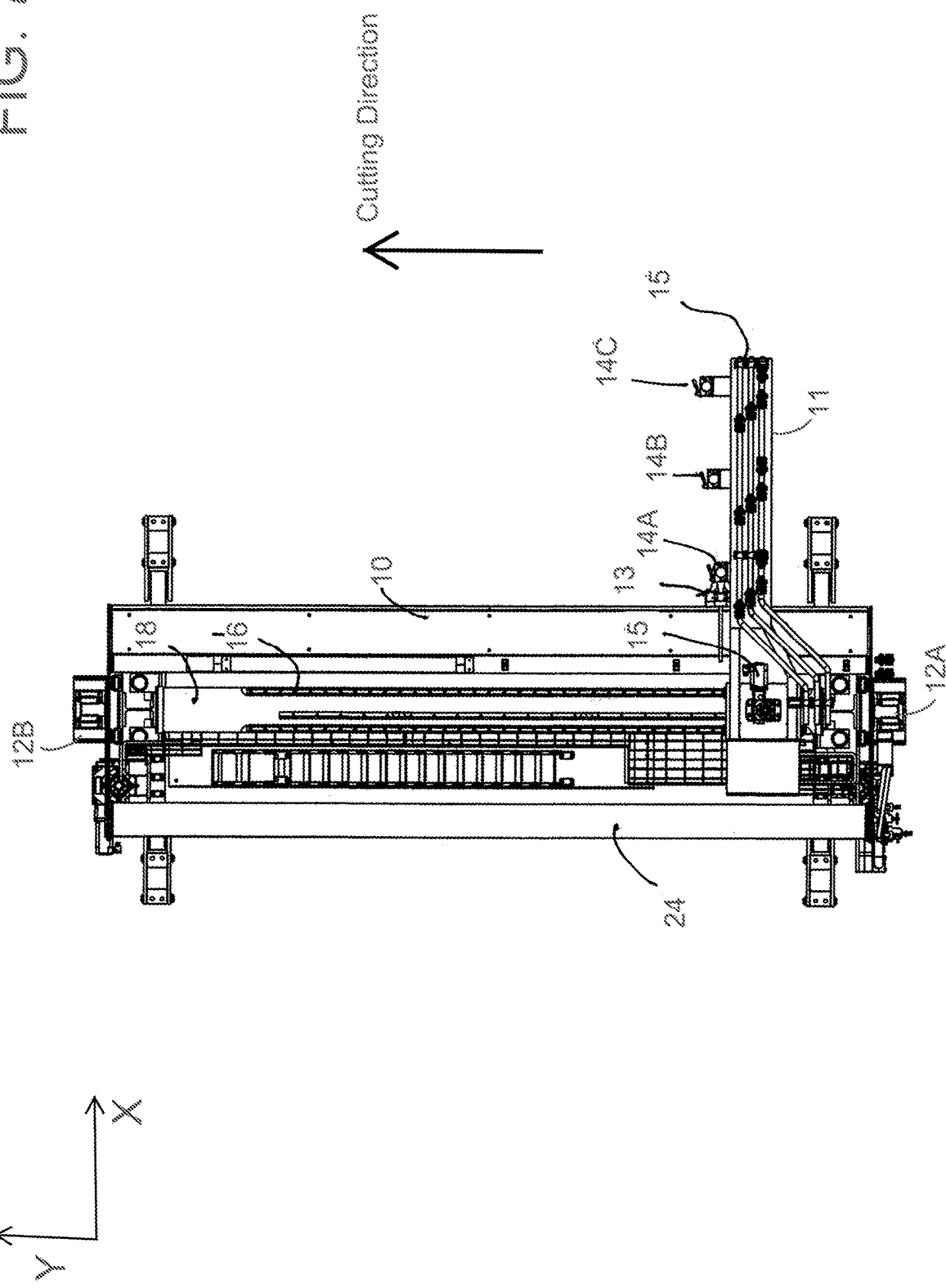

As particularly evident in FIG. 7, the torches 14 are staggered or offset from each other in the Y-axis to ensure that if one or more outer torches 14B and 14C are used to produce size-reduced scrap pieces, all cuts produced by such torches 14B and C are completed before the cut performed by the innermost torch 14A is completed. For example, during such an operation using all three torches 14 shown, all torches 14 simultaneously travel in the Y-direction. However, the outermost torch 14C arrives at the lateral edge of the slab first, followed by the inner adjacent torch 14B and so on, with the torch 14A arriving at the slab edge last, such that the scrap piece removed by the torch 14C will drop first, and then in succession the scrap pieces removed by the torches 14B and then 14A.

Lasers (not shown) are preferably disposed on opposite sides of the apparatus 4 to scan both lateral edges of a slab to sense its lateral edges and determine the start and stop of the cuts performed by the torches 14. A laser (not shown) is also preferably installed on the upper frame 18 to look downward to sense the top face of the slab for automatically adjusting the torch arm 11 and the deburring assembly 10 to accurately vertically track the shapes of the slabs 1A and 1B, and particularly the locations of the upper and lower faces of the slabs 1A and 1B along the paths that the lateral cuts are being made. This adjustment is represented in FIGS. 5, 6, and 8 as performed by two jack screws 19A and 19B coupled to servomotors 20A and 20B. A counterweight member 24 is provided to counter the weight of the deburrer translation assembly 17 that translates the deburring device 13 and a shield 27 that protects the deburrer translation assembly 17 from sparks created by the torches 14 and removed by the deburring device 13.

Plate mills often roll large batches of slabs to fill large orders and need to cut multiple slab pieces for each batch. A multi-cut machine as described in U.S. Patent Application Publication No. 2020/0108460 (whose contents are incorporated herein by reference) realizes such a large-scale operation. But there are also smaller orders requiring only one or two slab pieces. FIGS. 9 through 12 represent an example of a system that utilizes the apparatus 4 to avoid monopolizing a multi cut machine and lowering its productivity.

Figure 9:
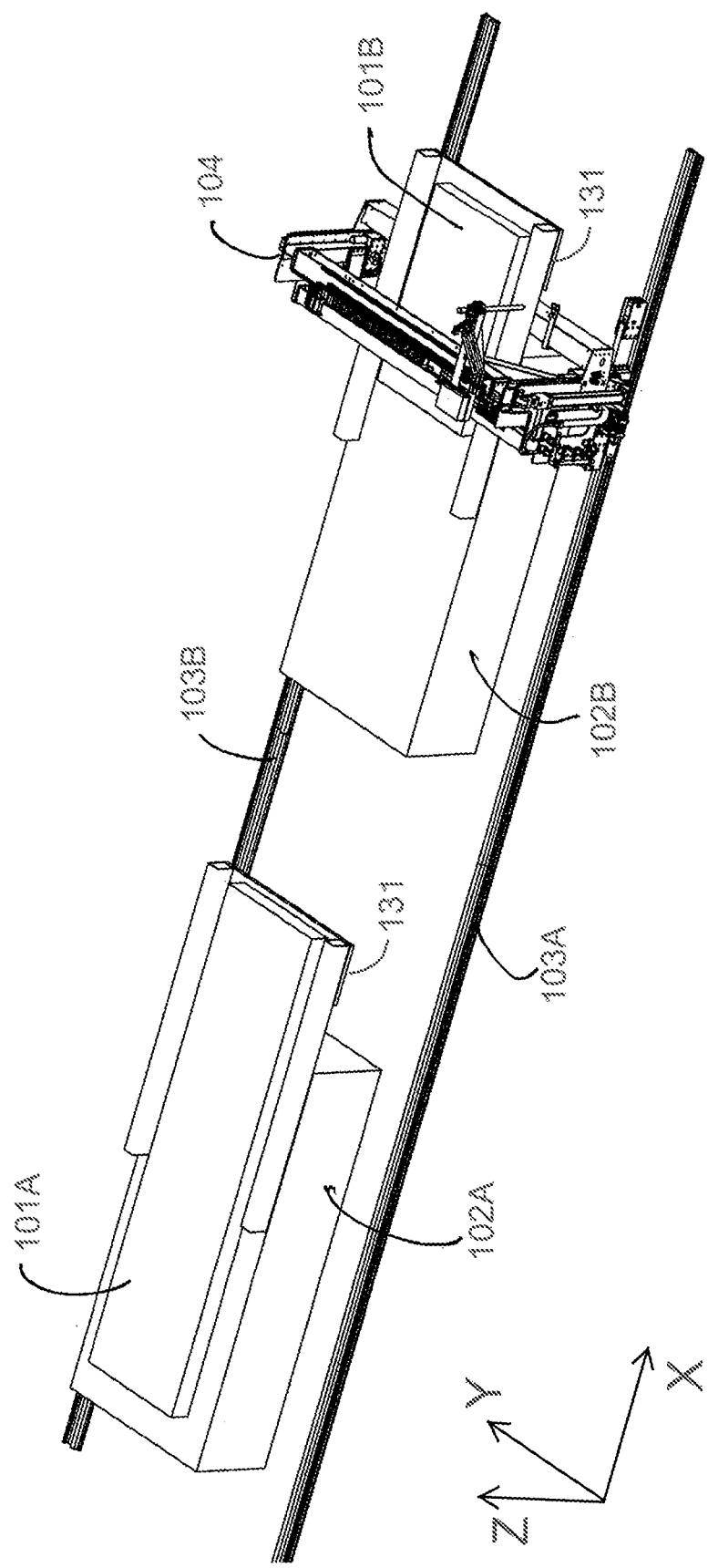
FIG. 9 is a perspective view schematically representing an automated cutting system for making cuts in one or more large masses of material according to another nonlimiting embodiment of the present invention.

The embodiment of the cutting system represented in FIGS. 9 through 12 utilizes an apparatus 4 that can be adapted for use in different settings to address different needs in steel-related industries. The following discussion will make reference to the use of the system to reduce the length of a slab to yield two reduced-size slabs. The cutting system represented in FIG. 9 is configured as a fully-automated cutting and deburring system that can perform cross (lateral) cuts in a stationary slab 1A/1B to yield a reduced-size slab (or slab piece) of a desired length for undergoing a subsequent rolling operation to produce a steel plate and yield substantially defect- and burr-free slabs to achieve high yields of quality steel plates in a steel mill.

The apparatus 4 is represented in FIGS. 9 through 12 as adapted to reduce the lengths of multiple slabs 101A and 101B separately supported by a corresponding number of supports 102A and 102B. More than one slab 101A and 101B can be positioned at separate cutting stations as show in FIG. 9 to optimize production. In the particular example shown, after the slab 101B is finish cut the apparatus 104 can travel to the other slab 101A located at a second station. The slab 101B can then be removed and another slab loaded on the support 102B while the slab 101A is being cut. The apparatus 104 translates between the supports 102A and 102B by traveling in the X-direction on wheels 125A, 126A, 125B, and 126B (FIGS. 10 and 11) supported on tracks 103A and 103B (FIG. 9). Two gear boxes 121A and 121B are coupled to two pinions 123A and 123B and servomotors 122A and 122B (FIG. 10) to move the apparatus 104 in the X-direction along the tracks 103A and 103B.

All slab pieces cut from a slab are prime material and not scrap, and therefore both sides of each cut made in a slab are desired to be burr-free. As evident from FIGS. 9, 10, and 11, the apparatus 104 only requires a single torch 114 (for example, an oxy-fuel cutting torch), though multiple torches may be provided and used. The apparatus 104 further comprises a deburring device 113 to remove burrs generated on both sides of the cut produced by the torch 114.

Figure 12:
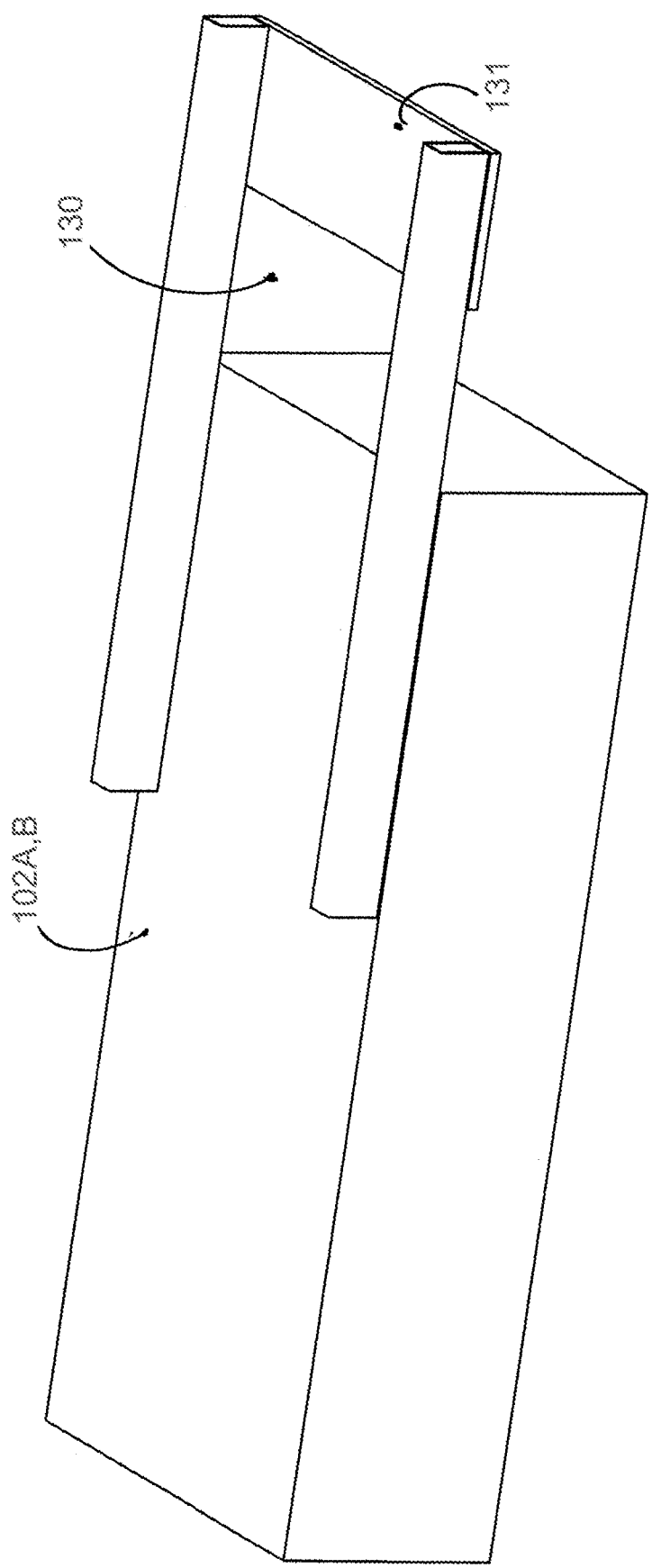

Slabs cut with the apparatus 104 may be a full slab 101A (the lefthand end of the system in FIG. 9) to cut one slab piece that will then undergo rolling with the remainder of the original slab being returned to stock as a remnant slab 101B, which as illustrated at the righthand end of the system in FIG. 9 can later be pulled from stock to be cut into two (or more) slab pieces. The slab supports 102A and 102B utilized by the apparatus 4 need to support and immobilize the slab 101A or 101B being cut and also slab pieces cut from the slabs 101A and 101B. For this purpose, FIGS. 9 and 12 depict each support 102A and 102B as having an extension 131 adapted to hold a portion of its slab 101A and 101B, and cutting is performed on the slabs 101A and 101B within an area above a slot 130 between each support 102A and 102B and its extension 131.

Figure 10:
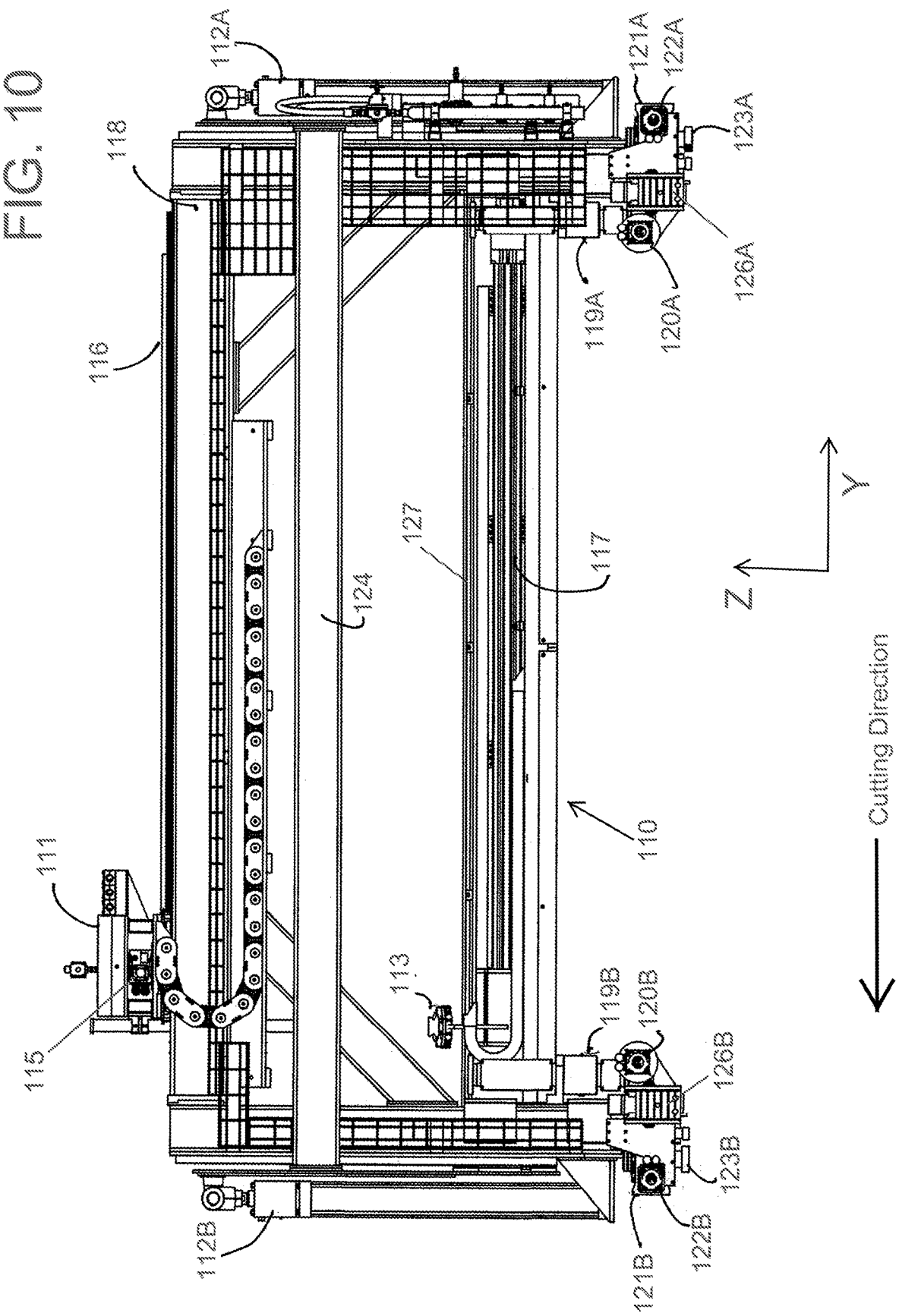
FIGS. 10 through 12 represent various views of a cross-cutting apparatus of the system of FIG. 9, in which the apparatus is adapted to make a single lateral cut in a steel slab to produce two reduced-size slabs and simultaneously debur the cut edges of both reduced-size slabs.
Figure 11:
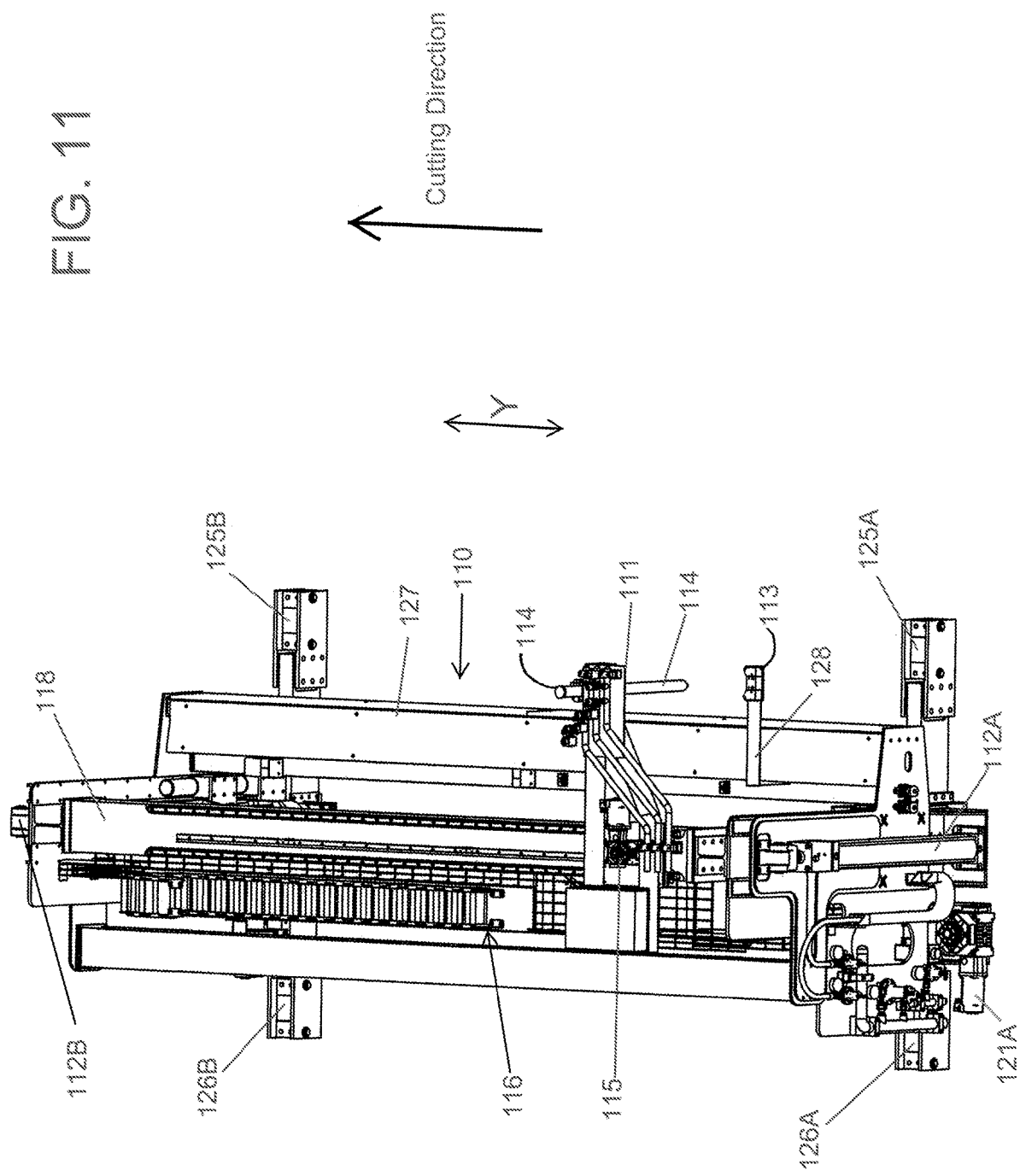

FIGS. 10 and 11 show the deburring device 113 of the apparatus 104 as part of a deburring assembly 110, which enables the deburring device 113 to be capable of moving in the Y and Z directions. FIG. 9 shows the deburring assembly 110 in a lowered position below the slab 101B, with the capability of being raised to a position above the slab 101B to enable the deburring assembly 110 to clear both supports 102A and 102B and the slabs 101A and 101B they support to enable the apparatus 104 to travel in the X-direction between the supports 102A and 102B. In the embodiment illustrated in FIGS. 9 through 12, the deburring assembly 110 is translatable in the Z-direction via pneumatic cylinders 112A and 112B (FIG. 10) to provide the raised position in which the deburring assembly 110 is extended upward to be able to clear the slabs 101A and 101B and supports 102A and 102B, in which case deburring does not occur, and retracted downward as shown in FIG. 10 to position the deburring device 113 underneath a slab (not shown) in order to perform the deburring operation by emitting a oxidizing gas stream that removes burrs generated along the cut produced by the torch 114. The deburring device 113 is capable of translating in the Y-direction via a deburrer translation assembly 117 comprising a servomotor and screw-based linear actuator (FIG. 10). The aforementioned U.S. Patent Application Publication No. US2017/0129119 discloses a nonlimiting example of a suitable deburring device. The oxidizing gas stream of the deburring device 113 is preferably predominantly oxygen up to 100% oxygen to oxidize burrs that form during the cutting operation before they are able to solidify. For this purpose, the deburring device 113 oscillates, or at least oscillates its oxidizing gas stream, in the Y-direction between locations that immediately lead and trail a breakthrough point at which the cut is being generated in a slab 101A/101B by the torch 114. Oscillation may be induced by the servomotor and screw-based linear actuator in the entire deburring assembly 110, or in only the deburring device 113 with a separate and dedicated oscillation mechanism.

The torch 114 is held by a torch arm 111 that extends in the X-direction from an upper frame 118. The torch arm 111 orients the torch 114 so that it emits a torch flame in a "torch" direction that is generally parallel to the Z-axis as shown, so as to make a cut in the Z (through-thickness) direction of the slab 101A or 101B, and the torch arm 111 is translatable in the Y (width) direction. A servomotor 115 and a track and rack assembly 116 (FIGS. 10 and 11) translate the torch arm 111 in the Y-direction so that the torch flame of the torch 114 is capable of producing a lateral (cross) cut in a "cutting" direction that is parallel to the Y-axis as shown. During cutting the deburring device 113 and torch arm 111 are synchronized by any suitable controller (not shown) to keep the center of the deburring device 113 aligned with the torch 114, as perhaps most evident in FIGS. 10 and 11. The deburring device 113 is shown as oriented to emit its oxidizing gas stream at the cut produced by the torch 114 generally in an upward direction transverse to the X-axis as shown, i.e., transverse to the X (length) direction of the slab 101A/101B, such as in the Y-Z plane, to be able to remove burrs generated on both sides of the cut. The orientation of the deburring device 113 may be achieved simply by rotating the deburring device 113 on its support arm 128.

Lasers (not shown) are preferably disposed on opposite sides of the apparatus 104 to scan both lateral edges of the slab to sense the lateral edges and determine the start and stop of the cuts performed by the torch 114. A laser (not shown) is also preferably installed on the upper frame 118 to look downward to sense the top face of the slab for automatically adjusting the torch arm 111 and the deburring assembly 110 to vertically track the shape of the slab 101A/101B. This adjustment is represented in FIG. 10 as performed by two jack screws 119A and 119B coupled to servomotors 120A and 120B. A counterweight member 124 is provided to counter the weight of the deburring assembly 110 that translates the deburring device 113 and a shield 127 that protects the deburrer translation assembly 117 from sparks created by the torch 114 and removed by the deburring device 113.

Figure 13:
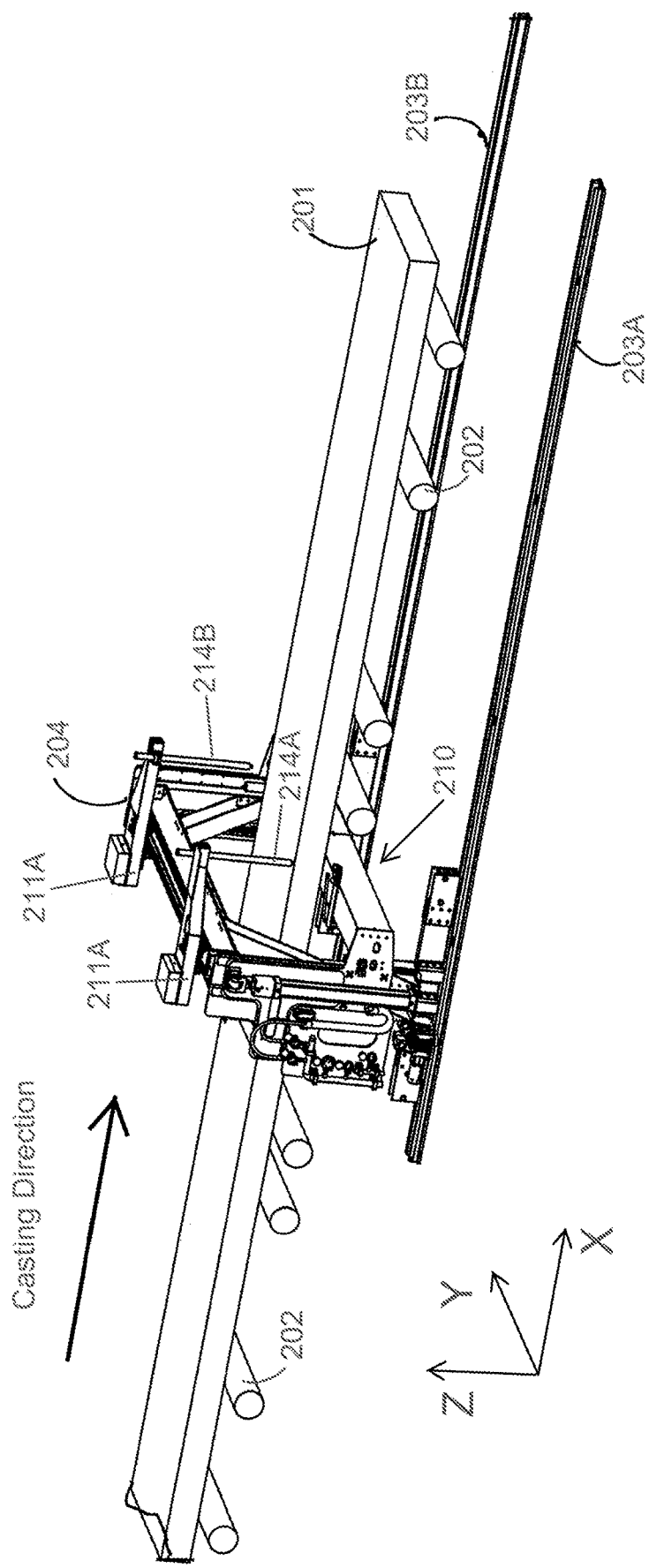
FIG. 13 is a perspective view schematically representing an automated cutting system for making cuts in one or more large masses of material according to another nonlimiting embodiment of the present invention.
Figure 14:
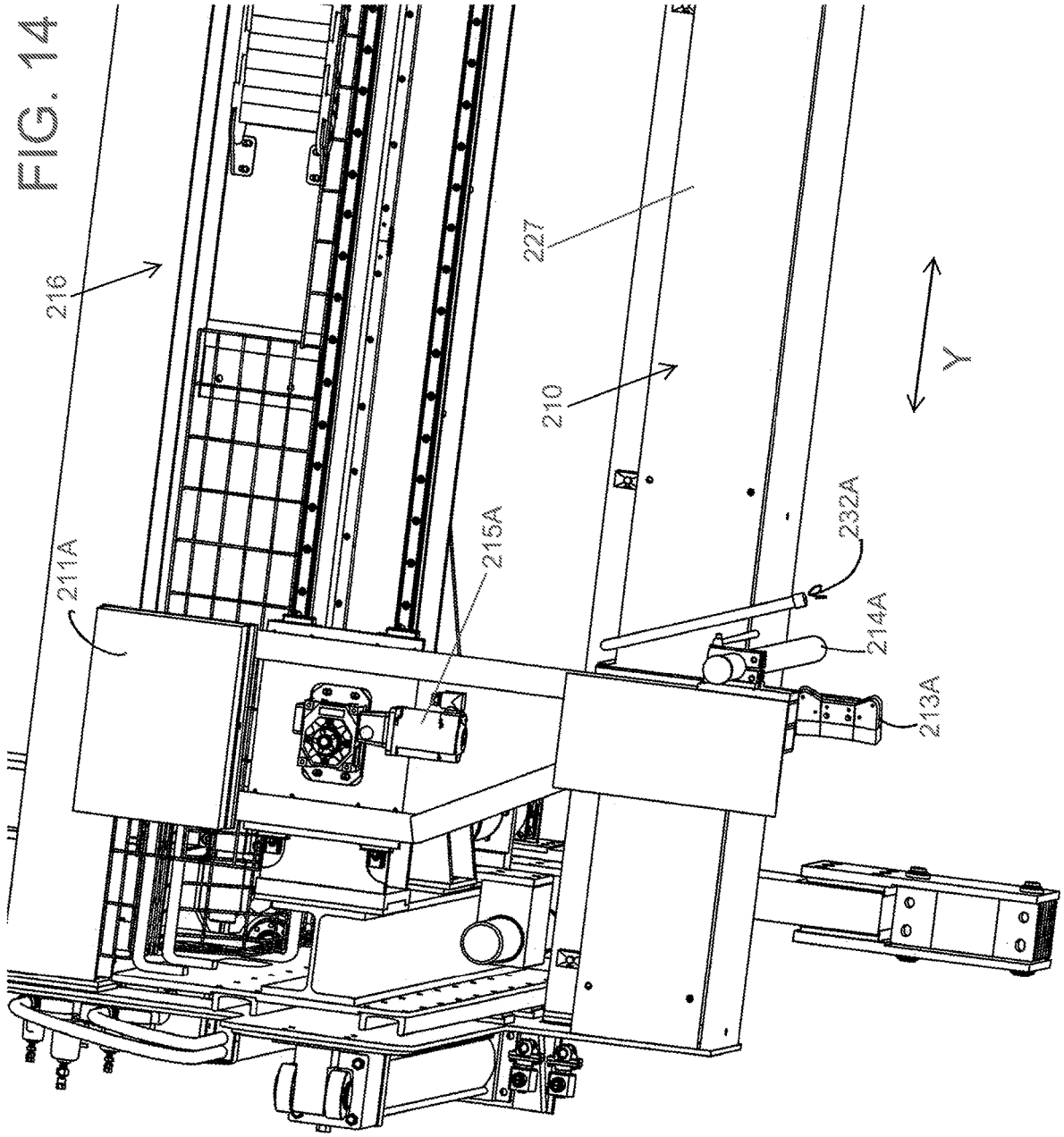

The embodiment of the cutting system represented in FIGS. 13 through 17 utilizes an apparatus 204 that can be adapted for use in settings to address additional needs in steel-related industries. The following discussion will make reference to the use of the system to produce slabs of desired lengths as a cast slab exits a continuous caster machine, at which point a steel slab may be at temperature of up to about 2700° F. (about 1500° C.). The cutting system represented in FIG. 13 is configured as a fully-automated cutting and deburring system that can perform cross (lateral) cuts in a moving slab 201 to yield a reduced-size slab (or slab piece) of a desired length for undergoing a subsequent rolling operation to produce a steel plate.

FIGS. 13 through 17 show an example of a system that utilizes the apparatus 204 in a continuous caster application. Conventional continuous caster cutoff machines use some type of cutting device, such as a traveling torch, to cut a solidified continuous casting into slabs of predetermined lengths as the casting exits a continuous caster machine in what is referred to herein as the casting direction. The cutoff operation is performed by synchronizing (electrically or mechanically) the cutting device to the casting speed to enable the cutoff operation to be performed as the slab continues to travel in the casting direction. Because the travel distance of a cutoff machine is usually limited, two torches cutting in opposite directions toward the center of a slab are preferably used to cut the slab as quickly as possible.

Burrs left by traditional continuous caster cutoff machines are an ongoing problem for steel mills. Attempts to remove burrs after a slab has been cut are commonly performed with mechanical means, for example, a blade or rotary hammer. These machines are costly, difficult to maintain, and often not 100% effective, which can create quality issues downstream of the cutoff and deburring operations.

The apparatus 204 is represented in FIGS. 13 through 17 as adapted to make a lateral cut in a steel slab 201 as the slab 201 exits a continuous caster machine (not shown) to produce reduced-size slabs and simultaneously debur the cut edges of the lateral cuts. The slab 201 is represented as traveling in the X-direction on supports 202 (comprising rollers or other suitable bearing means). The apparatus 204 is adapted to travel along the X-axis on wheels 225A and 225B (FIG. 15) supported on tracks 203A and 203B (FIG. 13). Two gear boxes 221A and 221B are coupled to two pinions 223A and 223B and servomotors 222A and 222B (FIG. 15) to move the apparatus 204 in the X-direction along the tracks 203A and 203B.

Figure 15:
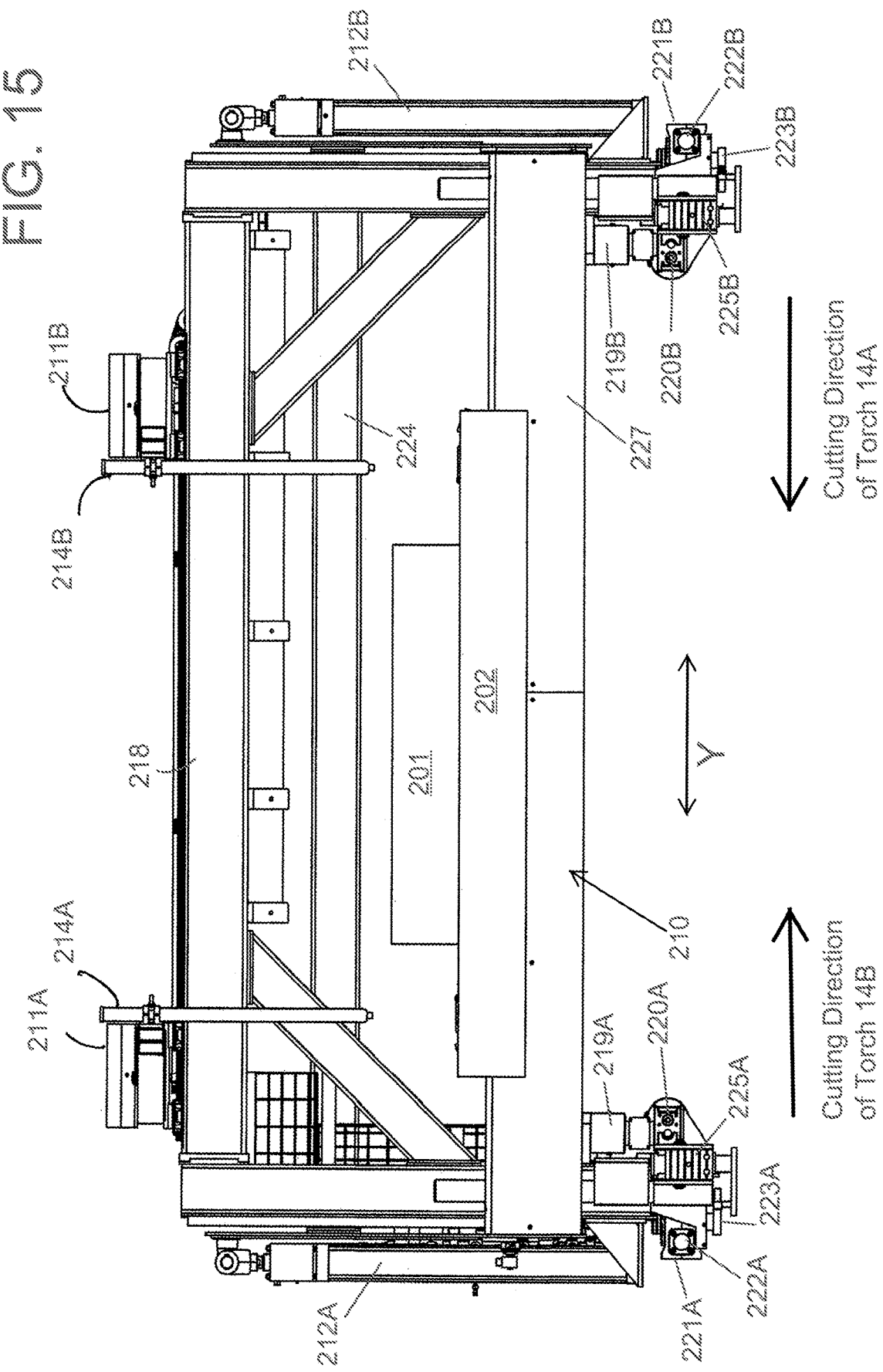
Figure 16:
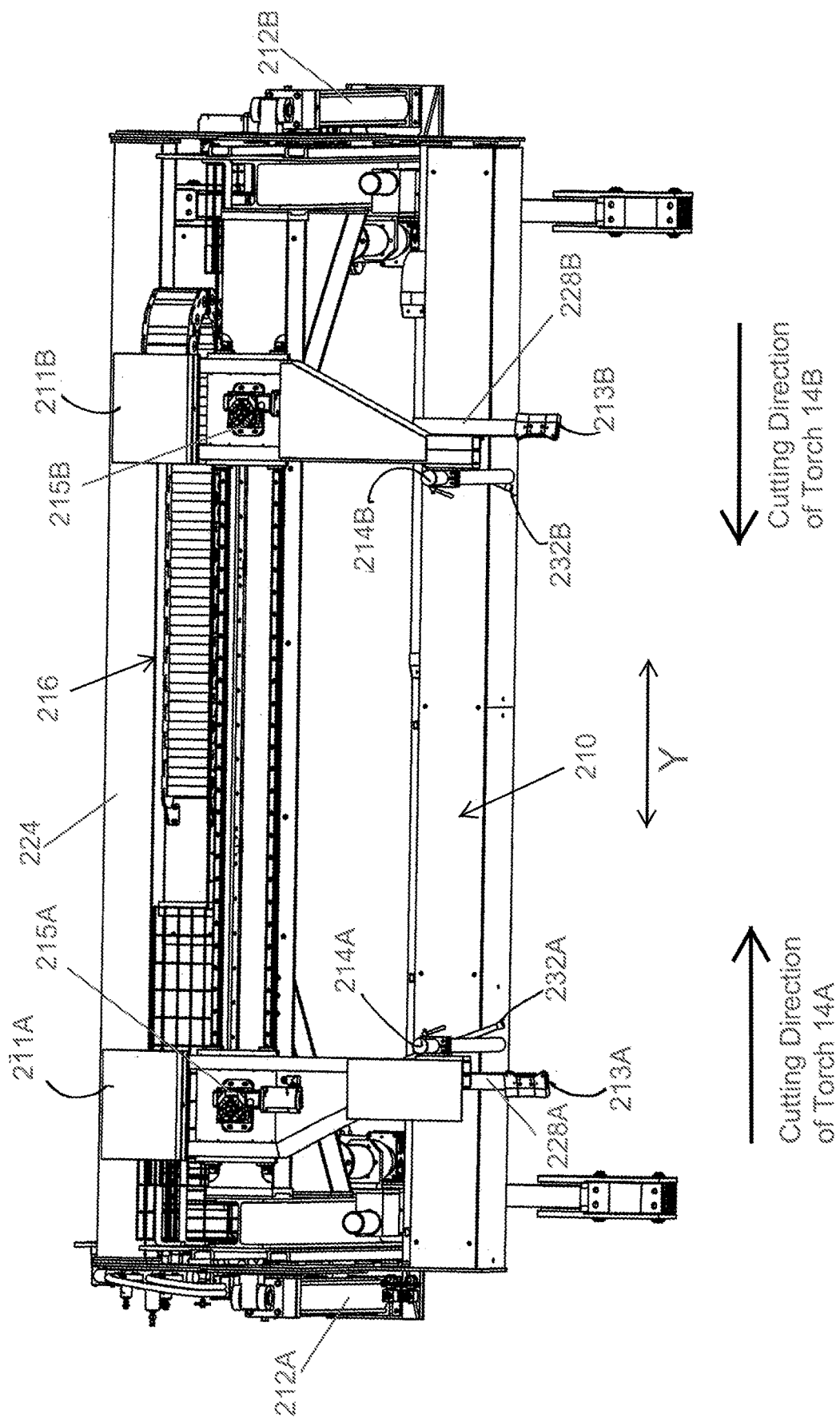

The apparatus 204 is shown as equipped with two torch arms 211A and 211B respectively holding torches 214A and 214B (for example, oxy-fuel cutting torches) and operable to travel in converging cutting directions from lateral edges of the slab 201 as evident from FIG. 15. The resulting reduced-size slabs are preferably free of defects including burrs created during the cutting operation, requiring that the cuts produced by the torches 214A and 214B are burr-free. For this reason, the apparatus 204 further comprises a deburring device 213A that faces the cutting direction of the torch 214A and is synchronized with the movement of the torch arm 211A carrying the torch 214A to remove burrs generated by the torch 214A, and a deburring device 213B that faces the cutting direction of the torch 214B and is synchronized with the movement of the torch arm 211B carrying the torch 214B to remove burrs generated by the torch 214B.

The deburring devices 213A and 213B of the apparatus 204 are part of a deburring assembly 210 capable of moving in the Z direction. FIG. 13 shows the deburring assembly 210 in a lowered position below the slab 201, with the capability of being raised to a raised position above the slab 201B to enable the deburring assembly 210 to clear the support 202 and slab 201 it supports. In the illustrated embodiment, the deburring assembly 210 is translatable in the Z-direction via pneumatic cylinders 212A and 212B (FIG. 15) to provide the lowered and raised positions. In the lowered position, the deburring devices 213A and 213B are underneath the slab 201 in order to perform the deburring operation by emitting a oxidizing gas stream that removes burrs generated along the cuts produced by the torches 214A and 214B. The deburring devices 213A and 213B are oriented to emit their oxidizing gas streams at the cuts produced by their respective torch 214A and 214B generally in an upward direction transverse to the X-axis as shown, i.e., transverse to the X (length) direction of the slab 201, such as in the Y-Z plane, to simultaneously debur both sides of the cut made by their respective torches 214A and 214B. In doing so, the oxidizing gas streams are projected toward each other and the center of the slab 201. The orientations of the deburring devices 213A and 213B may be achieved simply by rotating the deburring devices 213A and 213B on their respective support arms 228A and 228B.

The deburring devices 213A and 213B are each capable of translating in the Y-direction via a deburrer translation assembly (enclosed in a shield 227), for example, a servomotor and screw-based linear actuator. The aforementioned U.S. Patent Application Publication No. US2017/0129119 discloses a nonlimiting example of a suitable deburring device. The oxidizing gas stream of the deburring devices 213A and 213B is preferably predominantly oxygen up to 100% oxygen to oxidize burrs that form during the cutting operation before they are able to solidify. For this purpose, each deburring device 213A and 213B oscillates, or at least oscillates its oxidizing gas stream, in the Y-direction between locations that immediately lead and trail a breakthrough point at which the cut is being generated in the slab 201 by its corresponding torch 214A or 214B. Oscillation may be induced by the servomotor and screw-based linear actuator in the entire deburring assembly 210, or in only the individual deburring devices 213A and 213B with a separate and dedicated oscillation mechanism.

The torch arms 211A and 211B supporting the torches 214A and 214B extend in the X-direction from an upper frame 218. Each torch arm 211A and 211B orients its torch 214A and 214B so that it emits a torch flame in a "torch" direction that is generally parallel to the Z-axis as shown, so as to make a cut in the Z (through-thickness) direction of the slab 201, and the torch arms 211A and 211B are translatable in the Y (width) direction so that the torch flame of each torch 214A and 214B is capable of producing a lateral (cross) cut in a "cutting" direction that is parallel to the Y-axis of the slab 201. Servomotors 215A and 215B and a track and rack assembly 216 (FIGS. 14 and 16) translate the torch arms 211A and 211B in the Y-direction. During the cutting operation, the corresponding pairs of deburring devices 213A and 213B and torch arms 211A and 211B are synchronized by any suitable controller (not shown) to keep the center of each deburring device 213A and 213B aligned with its torch 214A and 214B, as perhaps most evident in FIG. 16. Each deburring device 213A and 213B is shown as oriented to emit its oxidizing gas stream at the cut produced by its corresponding torch 214A and 214B generally in an upward direction transverse to the X-axis as shown, i.e., transverse to the X (length) direction of the slab 201, such as in the Y-Z plane, to be able to remove burrs generated on both sides of the cut produced by its corresponding torch 214A and 214B. The orientations of the deburring devices 213A and 213B may be achieved simply by rotating the deburring devices 213A and 213B on their respective support arms 228A and 228B.

The torch arms 211A and 211B have home positions laterally outside the lateral edges of the slab 201 and are operated at the same time once the required length of the slab 201 has passed between the torches 214A and 214B, at which time the torches 214A and 214B initiate their respective cuts from the adjacent lateral edges of the slab 201. Before meeting in the middle of the slab 201, a first of the torches 214A/B is extinguished and begins to travel back to its home position while the second torch 214A/B continues cutting the slab 201 until the cut made by the first torch 124A/B is intersected to complete a combined lateral cut entirely through the slab 201, at which time the second torch 214A/B is extinguished and travels back to its home position. The apparatus 204 then returns via its rails 203A and 203B to its home position to be prepared to perform another cut on the portion of the slab 201 exiting the continuous caster machine.

The apparatus 204 is shown in FIGS. 13 through 17 as further equipped with nozzles 232A and 232B that are supplied with high-pressure streams, as a nonlimiting example, water flowing from any suitable high-pressure pump. The high-pressure streams preferably exit the nozzles 232A and 232B as flat vertically-oriented jets that capture matter during the cutting operation that was originally in the form of hot sparks generated by their respective torches 214A and 214B, dislodged by their respective deburring devices 213A and 213B, and then instantly solidified and granulated by the high-pressure streams to protect the opposite deburring device 213A/B. The apparatus 204 may further comprise heat shields (not shown) and the torches 214A and 214B are preferably water-cooled to withstand the high temperatures radiated by the steel slab 201 (e.g., at temperatures of up to about 2700° F. (about 1500° C.)). The deburring devices 213A and 213B may also be water-cooled, though in practice their oxidizing gas streams will often achieve a sufficient cooling effect to eliminate the need of a separate cooling circuit.

Travel of the entire apparatus 204 on the rails 203A and 203B is synchronized with the movements of both torch arms 211A and 211B, typically to enable the torches 214A and 214B to make cuts perpendicular to the lateral edges of the slab 201 as the apparatus 204 travels from a home position, which in FIG. 13 is the leftward-most position on the rails 203A and 203B and proximate the exit of a continuous caster machine (not shown).

Lasers (not shown) are preferably disposed on opposite sides of the apparatus 204 to scan both lateral edges of the slab 201 to sense the lateral edges and determine the start and stop of the cuts performed by the torches 214A and 214B. A laser (not shown) is also preferably installed on the upper frame 218 to look downward to sense the top face of the slab 201 for automatically adjusting the torch arms 211A and 211B and deburring assembly 210 to accurately vertically track the shape of the slab 201, and particularly the locations of the upper and lower faces of the slab 201 along the paths that the lateral cuts are being made. This adjustment is represented in FIG. 15 as performed by two jack screws 219A and 219B coupled to servomotors 220A and 220B. A counterweight member 224 is provided to counter the weight of the deburring assembly 210 that translates the deburring devices 213A and 213B and a shield 227 that protects the deburrer translation assembly from sparks created by the torches 214A and 214B and removed by the deburring devices 213A and 213B.

While the invention has been described in terms of particular embodiments, it should be apparent that alternatives could be adopted by one skilled in the art. For example, the cutting systems and their components could differ in appearance and construction from the embodiments described herein and shown in the drawings, functions of certain components of the cutting systems could be performed by components of different construction but capable of a similar (though not necessarily equivalent) function, and various materials could be used in the fabrication of the cutting systems and their components. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. An automated cutting system for reducing the size of a material by making at least one lateral cut along a Y-direction of the material, the automated cutting system comprising an apparatus comprising:
    at least a first support adapted to at least partially support the material;
    at least a first torch arm translatable in the Y-direction and supporting at least a first torch adapted for performing a cutting operation to form a lateral cut in the Y-direction of the material, the first torch emitting a torch flame in a torch direction so as to make a cut in a Z-direction of the material and so that the torch flame produces the lateral cut in a cutting direction in the Y-direction of the material while the material is supported by the first support; and
    at least a first deburring means associated with the first torch arm and translatable in the Y-direction to perform a first deburring operation, the first deburring means comprising means for translating the first deburring means in the Y-direction in synchrony with translation of the first torch in the Y-direction, an oxidizing gas, a first deburring device that emits a first oxidizing gas stream of the oxidizing gas, and means for oscillating the first deburring device in the Y-direction, the means for translating the first deburring means in the Y-direction and the means for oscillating the first deburring device in the Y-direction operating to locate the first oxidizing gas stream to simultaneously remove burrs along the lateral cut produced by the first torch in synchrony with the translation of the first torch in the Y-direction as the lateral cut is being produced by the first torch to oxidize the burrs before the burrs solidify, the oscillating means oscillating the first deburring device in the Y-direction such that the first oxidizing gas stream oscillates in the Y-direction between locations that lead and trail a breakthrough point at which the lateral cut is being generated in the material by the first torch.

2. The automated cutting system of claim 1, wherein the first torch arm extends in an X-direction from an upper frame of the apparatus.

3. The automated cutting system of claim 1, further comprising means for translating the first deburring device in the Z-direction to provide a first position in which the first deburring device is above the first support and able to clear the first material supported on the first support, and a second position in which the first deburring device is below the first material while supported on the first support in order to perform the first deburring operation.

4. The automated cutting system of claim 1, wherein the first deburring device is operable to emit the first oxidizing gas stream in an upward direction.

5. The automated cutting system of claim 1, further comprising means for automatically adjusting the first torch arm and the first deburring device to vertically track the shape of the material.

6. The automated cutting system of claim 5, wherein the automatically adjusting means comprises jack screws.

7. The automated cutting system of claim 1, wherein the automated cutting system reduces the size of the material by making the lateral cut along the Y-direction of the material while the material is stationary.

8. The automated cutting system of claim 7, wherein the first support is located at a first station of the automated cutting system and the automated cutting system further comprises:
    a second station comprising a second support adapted to at least partially support a second material; and
    means for transferring the apparatus between the first and second supports.

9. A method of operating the automated cutting system of claim 7 to reduce the size of the material and produce at least one reduced-size piece therefrom, the method comprising:
    performing the first cutting operation and the first deburring operation while the first deburring device is below the first material and the first material is supported and stationary on the first support;
    removing the first material from the first support;
    raising the first deburring device;
    translating the first apparatus in the Y-direction to a second support;
    lowering the first deburring device;
    placing a second material on the second support; and
    performing a second cutting operation and a second deburring operation while the first deburring device is below the second material and supported on the second support.

10. The method of claim 9, wherein the material is a steel slab.

11. The automated cutting system of claim 7, wherein the first torch arm is translatable in the Y-direction.

12. The automated cutting system of claim 11, the apparatus further comprising at least a second torch mounted on the first torch arm so as to be simultaneously translatable in the Y-direction with the first torch and adapted for performing a second lateral cut in the first material along the Y-direction in a Z-direction of the first material while the first material is supported by the first support, the second torch being arranged relative to the first torch to complete the second lateral cut before the first torch completes the first lateral cut.

13. The automated cutting system of claim 11, wherein the first deburring device emits the first oxidizing gas stream in the upward direction transverse to the Y-direction.

14. The automated cutting system of claim 7, wherein the first support comprises an extension adapted to hold a portion of the material and the apparatus is configured so that the first torch performs the cutting operation on the material in an area above a slot between the first support and the extension.

15. The automated cutting system of claim 14, wherein the first torch arm holds only the first torch.

16. The automated cutting system of claim 7, wherein the first deburring device emits the first oxidizing gas stream in the upward direction in a Y-Z plane.

17. The automated cutting system of claim 1, wherein the automated cutting system reduces the size of the material by making the lateral cut along the Y-direction of the material while the material moves in an X-direction.

18. The automated cutting system of claim 17, wherein the apparatus comprises:
  a second torch arm translatable in the Y-direction and comprising at least a second torch adapted for performing a second cutting operation that forms a second lateral cut in the first material along the Y-direction in a Z-direction of the first material while the first material is supported by the first support; and
  a second deburring means associated with the second torch arm and translatable in the Y-direction to perform a second deburring operation, the second deburring means comprising means for translating the second deburring means in the Y-direction in synchrony with translation of the second torch in the Y-direction, a second deburring device that emits a second oxidizing gas stream of the oxidizing gas, and means for oscillating the second deburring device in the Y-direction, the means for translating the second deburring means in the Y-direction and the means for oscillating the second deburring device in the Y-direction operating to locate the second oxidizing gas stream to simultaneously remove burrs along the second lateral cut produced by the second torch as the second lateral cut is being produced.

19. The automated cutting system of claim 18, wherein the first torch completes the first lateral cut before the second torch completes the second lateral cut, and the second torch completes the second lateral cut to form a combined lateral cut entirely through the material.

20. The automated cutting system of claim 18, wherein the first support is located at an exit of a continuous caster machine and the automated cutting system further comprises means for transferring the apparatus in the X-direction away from the continuous caster machine.

21. The automated cutting system of claim 18, wherein the first and second torch arms extend in the X-direction from an upper frame of the apparatus.

22. The automated cutting system of claim 18, further comprising means for translating the first and second deburring means in the Z-direction to provide a first position in which the first and second deburring devices are above the first support and able to clear the first material supported on the first support, and a second position in which the first and second deburring devices are below the first material while supported on the first support in order to perform the first deburring operations.

23. The automated cutting system of claim 18, wherein the first and second deburring devices emit the first and second oxidizing gas streams thereof in the upward direction in a Y-Z plane.

* * * * *